Dec. 5, 1967 M. M. KAUFMAN 3,356,998
MEMORY CIRCUIT USING CHARGE STORAGE DIODES
Filed March 5, 1964
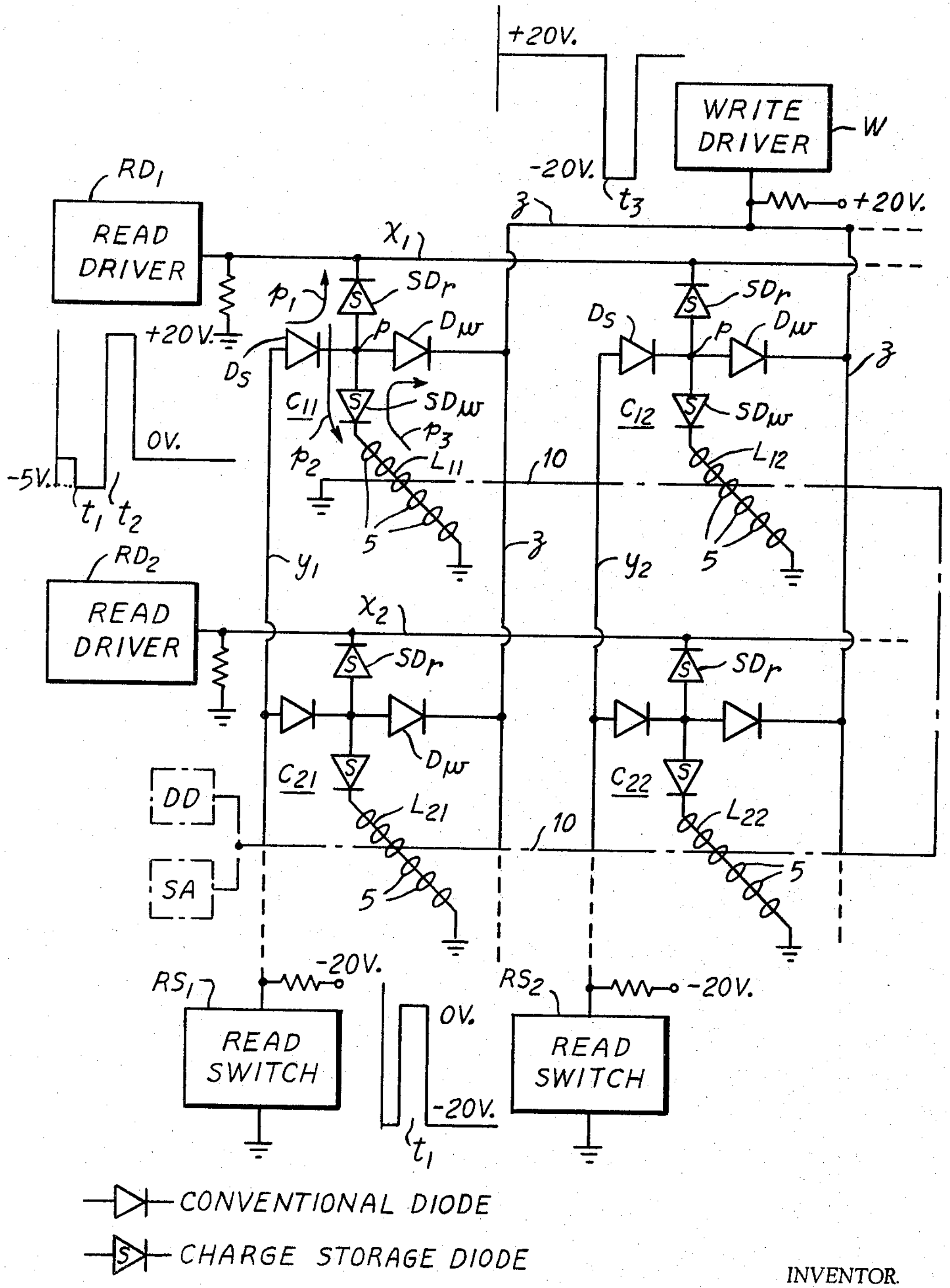
INVENTOR.
MELVIN M. KAUFMAN
BY
Carl V. Olson
ATTORNEY United States Patent Office 3,356,998

Patented Dec. 5, 1967

3,356,998
MEMORY CIRCUIT USING CHARGE STORAGE DIODES

Melvin M. Kaufman, Levittown, N.J., assignor to Radio Corporation of America, a corporation of Delaware Filed Mar. 5, 1964, Ser. No. 349,716
12 Claims. (Cl. 340—173)

This invention relates to circuits including charge storage diodes, and to systems by which any location in an array may be accessed. The selection circuits of the invention, although not limited thereto, are particularly suitable for use in word-organized, random-access memories.

In word-organized, random-access memories a diode matrix is often used for the purpose of accessing any desired word in the memory. When the conventional diode matrix selection schemes are applied to memories of large size which are intended to operate at high speeds, it is found that the capacitance presented by all the word lines coupled to one row or column selection conductor is large. The resulting charging currents which flow upon energization of a selection conductor are correspondingly large and disturbing. Large current supplying capabilities are required of the selection drivers. The changing of the voltages on many nonselected word lines results in the capacitive coupling of large noise signals to the sense lines. The amplitudes of the noise signals coupled to the sense lines may be larger than the desired information signals when high speed operation is attempted.

It is a general object of this invention to provide an improved selection scheme in which selection voltages are isolated from all lines except one selected line.

It is another object to provide an improved memory in which the selection of one of many word lines can be accomplished at high operating speeds by economical selection means.

It is a further object to provide an improved circuit for supplying sequential opposite-polarity pulses to a utilization device.

In accordance with a general example of the invention, first and second charge storage diodes have like terminals connected together. A current is applied through solely the first diode in the forward direction to store a charge therein. Then a current is applied through the first diode in the reverse direction and through the second diode in the forward direction. Finally, current is applied in the reverse direction through the second diode.

In accordance with another example of the invention, a plurality of word line circuits are each associated with a crossover of a row selection conductor and a column selection conductor. Each of the word line circuits includes a junction point, a selection diode connected from a column selection conductor to the junction point, a read charge storage diode connected from the junction point to a row selection conductor, a write charge storage diode connected from the junction point to a memory word line, and an impedance connected from the junction point to a common write bus. Selection means energize any one row selection conductor and any one column selection conductor to cause a current in the forward direction passing through one read charge storage diode. Read means subsequently energizes the one row selection conductor to cause a read current through one selected word line in the read direction. Finally, write means subsequently energizes the common write bus to cause a write current through the selected word line in the opposite or write direction.

The sole figure in the drawing shows an array of four word lines arranged in two rows and two columns, and shows means for selectively applying read and write pulses through any desired one of the word lines.

Referring now in greater detail to the drawing, four word lines $L_{11}$, $L_{12}$, $L_{21}$ and $L_{22}$ are arranged, for convenience of description, in an array of two rows and two columns. The arrangement shown is illustrative of the organization of a memory having a very much greater number of word lines. Each word line is used for the storage of a number of information bits in the states of a corresponding plurality of memory elements such as the magnetic cores illustrated by the loops 5.

A row selection conductor $x_1$ associated with word lines $L_{11}$ and $L_{12}$ is connected through an impedance to ground reference potential and to a read driver $RD_1$. Similarly, a row selection conductor $x_2$ associated with word lines $L_{21}$ and $L_{22}$ is connected through an impedance to ground reference potential and to a read driver $RD_2$.

A column selection conductor $y_1$ associated with word lines $L_{11}$ and $L_{21}$ is connected through an impedance to a source of potential which may have a value of −20 volts and is connected to a read switch $RS_1$. Similarly, a column selection conductor $y_2$ associated with word lines $L_{12}$ and $L_{22}$ is connected through an impedance to a −20 volt bias source and to a read switch $RS_2$.

A common write bus $z$ associated with all of the word lines is connected through an impedance to a source of bias potential which may be at +20 volts and to a write driver W. The outputs of the read drivers, the read switches, and the write drivers may have waveforms and timings as represented by the waveform charts adjacent to the respective units, $t_1$, $t_2$ and $t_3$ being successive times.

A different word line circuit respectively including a word line and diodes is associated with each crossover of a row selection conductor and a column selection conductor. Word line circuit $C_{11}$ includes word line $L_{11}$; word line circuit $C_{12}$ includes word line $L_{12}$; etc. Each word line circuit respectively includes a selection diode $D_s$ connected from a column selection conductor to a junction point P, a read storage diode $SD_r$ connected from the junction point P to a row selection conductor, a write charge storage diode $SD_w$ connected from the junction point P to the associated word line, and an impedance, which is preferably a conventional diode $D_w$, connected from the junction point P to the common write bus $z$. The use of an ordinary impedance, such as a resistor, in place of each conventional write diode $D_w$, places higher current-supplying requirements on the drivers and switches.

The components thus far described permit the accessing of any one of the word lines for the reading and writing of information. In practice, the memory system also includes as many digit-sense lines as there are memory storage elements 5 in each word line. One digit-sense line is represented by a phantom line 10 and is shown to link a corresponding one of the memory elements 5 in each of the four word lines. The digit-sense line 10 is coupled at one end to a digit driver DD and to a sense amplifier SA, and at the other end to a connection to a common return path indicated in the drawing as circuit ground. The other digit-sense lines (not shown) are similarly each coupled to a digit driver and a sense amplifier and ground.

The charge storage diodes $SD_r$ and $SD_w$ are commercially available devices also referred to as "snap" diodes or "snap-off" diodes. A charge storage diode differs from a conventional semiconductor diode in that it has an intentional, large charge-storage characteristic. When a current pulse is applied through the charge storage diode in the forward direction, a charge remains stored in the diode after the termination of the pulse. The effect of the stored charge is to cause the diode to have a very low impedance in the back or reverse direction for a period of time corresponding with the time required to sweep the stored charge out of the diode.

In the operation of the memory system described, the destructive reading of a word of information stored along one of the word lines is accomplished prior to the writing of the same or different information into the word storage location along the same word line. One of the four word line circuits is selected for reading by energizing one of the row selection read drivers $RD_1$, $RD_2$ and concurrently energizing one of the column selection read switches $RS_1$, $RS_2$.

Normally, in the absence of energization of a selection conductor, all of the conventional diodes $D_s$ and $D_w$, and all of the charge storage diodes $SD_r$ and $SD_w$ are back biased and nonconductive. If the column read switch $RS_1$ is the one that is energized at time $t_1$, the column selection conductor $y_1$ is raised to ground potential. This reduces the back bias on the selection diodes $D_s$ in the word line circuits $C_{11}$ and $C_{21}$. However, the diodes do not become forward biased and no current flows through them. If, at the same time $t_1$, the read driver $RD_1$ is the one which is energized, the row selection conductor $x_1$ is lowered in potential to a value such as −5 volts. This reduces the back bias on the charge storage diodes $SD_r$ in the word line circuits $C_{11}$ and $C_{12}$. A word selection charging or priming current then flows in the path $p_1$ through the selection diode $D_s$, through junction point P and through the associated read charge storage diode $SD_r$ to the row selection conductor $x_1$. The selection current flow causes a charge to be stored in the charge storage diode $SD_r$ in the word line circuit $C_{11}$. There is no current flow through the corresponding diodes of the other word line circuits $C_{12}$, $C_{21}$ and $C_{22}$.

At time $t_2$, following the selection charging current supplied at time $t_1$, the energized read driver $RD_1$ supplies a positive pulse which may have a value of +20 volts to the same row selection conductor $x_1$. This causes a read current pulse to flow in the path $p_2$ from the row selection conductor $x_1$ through the read charge storage diode $SD_r$ of the circuit $C_{11}$, the junction point P, the write charge storage diode $SD_w$ and the word line $L_{11}$ to the ground return path. The read current pulse flowing through the word line circuit $C_{11}$ is permitted by the charge stored in the diode $SD_r$, because the diode presents a low impedance to the flow of current in the reverse direction until the charge stored in the diode has been swept out by the current passing therethrough. No current flows through the read charge storage diode $SD_r$ of circuit $C_{12}$ because the read storage diode therein does not have a stored charge and it therefore presents a high impedance to the flow of current.

The read current passed by the read charge storage diode $SD_r$ of circuit $C_{11}$ during time $t_2$ is directed through the word line $L_{11}$ and is blocked from flowing through the selection conventional diode $D_s$ and the write conventional diode $D_w$ because these diodes are highly back-biased by the −20 volts on the column selection conductor $y_1$ and the +20 volts on the common write bus $z$.

The read current passed during time $t_2$ through the write storage diode $SD_w$ and the word line $L_{11}$ causes the reading out of the information stored in the many magnetic elements or cores 5 linked by the word line $L_{11}$. The read current causes a destructive reversal of the stored flux in cores that were storing a "1" information bit. The flux reversal causes the inducing of a sense signal on the digit-sense conductor linking the respective cores of all of the word lines in the memory. There are as many digit-sense lines as there are memory elements 5 in each memory word. Only one of the digit-sense lines 10 is included in the drawing and represented by the phantom line 10 connected to a respective digit-driver DD and a respective sense amplifier SA.

The read current passed at time $t_2$ by the read storage diode $SD_r$ in the path $p_2$ through the write storage diode $SD_w$ and the word line $L_{11}$ causes a charge to be stored in the write storage diode $SD_w$. This stored charge is used during time $t_3$ to permit the flow of a write current pulse in the reverse or write direction through the word line $L_{11}$ of the previously-selected word line circuit $C_{11}$. At time $t_3$, the write driver W applies a negative voltage pulse, which may have a value of −20 volts, through the common write bus $z$ to the conventional write diodes $D_w$ of all of the word line circuits. The only word line circuit which can supply a current to the common write bus $z$ is the word line circuit $C_{11}$ in which there is a stored charge in its write charge storage diode $SD_w$. This diode presents a low impedance to the flow of current until the charge stored therein has been swept out by the current. The write current flows in the path $p_3$ from ground through the selected word line $L_{11}$ in the reverse or write direction, through the write charge storage diode $SD_w$ in the reverse direction, and through the write conduction diode $D_w$ in the forward direction.

The writing of the same or different information into the storage elements along the word line $L_{11}$ is accomplished at the time $t_3$ by the concurrent selective energization of the digit drivers of which one is illustrated at DD. A digit drive DD is energized concurrently with the write driver W when the writing of a "1" in the corresponding bit location in the selected word is desired. The absence of a digit pulse from the digit driver DD is used for the writing of a "0." In this case, the write pulse acting alone on a memory element in the selected word is of insufficient amplitude to significantly change the magnetic condition of the element.

To summarize the operation: At time $t_1$ one column selection conductor and one row selection conductor are energized to pass a selection priming current pulse in the path $p_1$ through the read storage diode $SD_r$ of the one selected word line at the crossover of the two selection conductors. The selection current pulse causes a charge to be stored in the read storage diode $SD_r$. At time $t_2$, the same row conductor is energized and the selected charge storage diode $SD_r$ having a charge therein permits a read current pulse to flow in the path $p_2$ through the associated write storage diode $SD_w$ and the associated word line in the read direction. This read current pulse causes a charge to be stored in the write storage diode $SD_w$. At time $t_3$ the common write bus $z$ is energized and the one selected and charged write storage diode $SD_w$ permits a write current to flow in the path $p_3$ through the selected word line in the opposite or write direction. All of the word lines, except the one selected word line, are electrically isolated from the energized column selection conductor, and the energized row selection conductor. This isolation avoids the capacitive coupling of noise from unselected word lines to the digit sense lines during the time $t_2$ when the reading out of stored information is performed.

After information has been read out of and written into a selected word line, any other word line may be selected for another read and write cycle of operation in the same manner as has been described. The reading of information from one selected word line can be accomplished at very high speeds in memories having a great number of word lines without the capacitive coupling of prohibitive amounts of noise through selection conductors and unselected word lines to the digit-sense lines and associated sense amplifiers.

What is claimed is:

1. The combination of first and second charge storage diodes having like terminals connected together, means to apply a current through said first diode in the forward direction to store a charge therein, means to apply a current through said first diode in the reverse direction and through said second diode in the forward direction to store a charge in the second diode, and means to apply a current in the reverse direction through said second diode.

2. The combination of first and second charge storage diodes having like terminals connected together, means to apply a current through said first diode in the forward direction to store a charge therein, means to apply a current through said first diode in the reverse direction and through said second diode in the forward direction to sweep the stored charge from the first diode and to store a charge in the second diode, and means to apply a current in the reverse direction through said second diode to sweep the stored charge therefrom.

3. The combination of first and second charge storage diodes having like terminals connected together, a utilization device connected to the other terminal of said second diode, means to apply a current through solely said first diode in the forward direction to store a charge therein, means to apply a current through said first diode in the reverse direction, through said second diode in the forward direction and through said utilization device to sweep the stored charge from the first diode, to supply a current to said utilization device and to store a charge in the second diode, and means to apply a current in the reverse direction through said second diode to sweep the stored charge therefrom and supply an opposite-direction current to said utilization device.

4. The combination of first and second charge storage diodes having like terminals connected together, a memory word line connected to the other terminal of said second diode, means to apply a priming current through solely said first diode in the forward direction to store a charge therein, means to apply a read current through said first diode in the reverse direction, through said second diode in the forward direction and through said word line to sweep the stored charge from the first diode, to supply a read current to said word line and to store a charge in the second diode, and means to apply a write current in the reverse direction through said second diode to sweep the stored charge therefrom and supply an opposite-direction current to said word line.

5. In a memory array, a plurality of row selection conductors and a plurality of column selection conductors, a plurality of word line circuits each associated with a crossover of a row selection conductor and a column selection conductor, each of said circuits including a selection diode connected from a column selection conductor to a junction point, a read charge storage diode connected from said junction point to a row selection conductor, and a write charge storage diode connected from said junction point to a memory word line, means to apply a selection current through any one row selectiton conductor, one selection charge storage diode and any one column selection conductor, means to apply a read current through said one row selection conductor, said selection charge storage diode, the associated word line, and means to apply a write current through said write charge storage diode and the associated word line.

6. In a memory array, a plurality of row selection conductors and a plurality of column selection conductors, a common write bus, a plurality of word line circuits each associated with a crossover of a row selection conductor and a column selection conductor, each of said circuits including a selection diode connected from a column selection conductor to a junction point, a read charge storage diode connected from said junction point to a row selection conductor, a write charge storage diode connected from said junction point to a memory word line, and a write impedance connected from said junction point to said common write bus, selection means to energize any one row selection conductor and any one column selection conductor to select one of said word line circuits, read means to subsequently energize said one row selection conductor to cause a read current through the selected word line in one direction, and write means to subsequently energize said write bus to cause a write current through the selected word line in the opposite direction.

7. In a memory array, a plurality of row selection conductors and a plurality of column selection conductors, a common write bus, a plurality of word line circuits each associated with a crossover of a row selection conductor and a column selection conductor, each of said circuits including a selection diode connected from a column selection conductor to a junction point, a read charge storage diode connected from said junction point to a row selection conductor, a write charge storage diode connected from said junction point to a memory word line, and a write impedance connected from said junction point to said common write bus, selection means to energize any one row selection conductor and any one column selection conductor to select one of said word line circuits, read means to subsequently energize said one row selection conductor to cause a read current through the selected word line in one direction, and write means to subsequently energize said write bus to cause a write current through the selected word line in the opposite direction.

8. In a memory array, a plurality of row selection conductors and a plurality of column selection conductors, a common write bus, a plurality of word line circuits each associated with a crossover of a row selection conductor and a column selection conductor, each of said circuits including a selection diode connected from a column selection conductor to a junction point, a read charge storage diode connected from said junction point to a row selection conductor, a write charge storage diode connected from said junction point to a memory word line, and a write impedance connected from said junction point to said common write bus, selection means to energize any one row selection conductor and any one column selection conductor to select one of said word line circuits by passing a priming current through one selection diode and the associated read charge storage diode, read means to subsequently energize said one row selection conductor to cause the charge accumulated in the selected read storage diode to flow as a read current through the selected write storage diode and associated selected word line in one direction, and write means to subsequently energize said write bus to cause the charge accumulated in the selected write charge storage diode to flow as a write current through the selected word line in the opposite direction.

9. A memory array comprising a plurality of row selection conductors and a plurality of column selection conductors, a plurality of word line circuits each associated with a crossover of a row selection conductor and a column selection conductor, each of said word line circuits including a selection diode connected from a column selection conductor to a junction point, a read charge storage diode connected from said junction point to a row selection conductor, and a write charge storage diode connected from said junction point to a memory word line, a plurality of memory elements linked by each of said word lines, means to apply a selection current through any one row selection conductor, one selection charge storage diode and any one column selection conductor, means to apply a read current through said one row selection conductor, said selection charge storage diode, the associated word line, means to apply a write current through said write charge storage diode and the associated word line, and a plurality of digit-sense line means linking corresponding memory elements of all word lines.

10. In a memory array, a plurality of row selection conductors and a plurality of column selection conductors crossing said row selection conductors, a memory word line associated with each crossover of a row and a column selection conductor, a current path including a conventional diode, a junction point and a read charge storage diode connected from each column conductor to each row conductor at each crossover, a write charge storage diode connected from each junction point to a corresponding word line, means to energize any one of said row selection conductors and any one of said column selection conductors to cause a priming current through the selected one of said read storage diodes and to cause a following read current through the selected one of said write storage diodes and the associated word line, and means coupled to all of said junction points to subsequently cause the charge accumulated in the selected write charge storage diode to flow as an opposite direction write current through the selected word line.

11. In a memory array, a plurality of word conductors arranged in rows and columns each of said word conductors linking a plurality of memory elements for the storage of an information word, a plurality of write storage diodes each connected in series with a respective one of said word conductors, a plurality of row selection conductors and a plurality of column selection conductors corresponding with respective ones of said rows and columns of word conductors, a plurality of read storage diodes each connected between a word conductor and a row selection conductor, a plurality of read conventional diodes each connected between a word conductor and a column selection conductor, means to energize any one of said row selection conductors and any one of said column selection conductors to cause a prime current through one selected read pair of storage and conventional diodes followed by a read current in one direction from the read charge diode through the selected word conductor, and means to energize all the word conductors to cause the charge accumulated in the write storage diode of the one selected word conductor to flow as an opposite direction write current through thes elected word conductor.

12. In a memory array, a plurality of row selection conductors, and a plurality of column selection conductors crossing said row selection conductors, a memory word line associated with each crossover of a row and a column selection conductor, a plurality of current paths each including a selection conventional diode, a junction point and a read charge storage diode connected from a column conductor to a row conductor at a crossover, a plurality of write charge storage diodes each connected from a junction point to a respective word line, selection means to energize any one of said row selection conductors and any one of said column selection conductors to cause a priming current through the selected one of said read storage diodes, read means to subsequently energize said one column selection conductor to cause the charge accumulated in the selected read storage diode to flow as a read current through the one associated write storage diode and the respective word line in one direction, and a write bus connected through write conventional diodes to all of said junction points, write means to subsequently energize said write bus to cause the charge accumulated in said one write charge storage diode to flow as a write current through the selected word line in the opposite direction.

References Cited

UNITED STATES PATENTS 3,206,730 9/1965 Igarashi ----------- 340—173

TERRELL W. FEARS, *Primary Examiner.*